United States Patent
Desoli et al.

(10) Patent No.: US 6,976,073 B2
(45) Date of Patent: Dec. 13, 2005

(54) TRANSPARENT REMOTE DATA STORAGE DEVICE AND METHOD

(75) Inventors: Giuseppe Desoli, Watertown, MA (US); Paolo Faraboschi, Brighton, MA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 659 days.

(21) Appl. No.: 09/995,774

(22) Filed: Nov. 29, 2001

(65) Prior Publication Data

US 2003/0101325 A1 May 29, 2003

(51) Int. Cl.$^7$ .............................................. G06F 15/16
(52) U.S. Cl. ...................... 709/224; 714/48
(58) Field of Search ................. 709/201, 216, 709/217, 238, 302, 224; 714/1, 48, 699, 819

(56) References Cited

U.S. PATENT DOCUMENTS

| | | | | |
|---|---|---|---|---|
| 5,848,420 A | * | 12/1998 | Xu | 707/104.1 |
| 6,014,727 A | * | 1/2000 | Creemer | 711/118 |
| 6,021,445 A | * | 2/2000 | Chapa | 719/328 |
| 6,856,414 B1 | * | 2/2005 | Haneda et al. | 358/1.15 |

* cited by examiner

*Primary Examiner*—David Y. Eng

(57) ABSTRACT

A memory device for use by an electronic appliance has a first data port, a second data port, a data storage portion, and a data allocation device. The first data port is operatively connectable to the electronic appliance. The second data port is operatively connectable to a remote memory device. The data allocation device is operatively connected to the first data port, the second data port, and the data storage portion. The data allocation device is adapted to allocate a portion of memory within the remote memory device for use by the electronic appliance and route data between the first data port, the second data port, and the data storage portion.

24 Claims, 2 Drawing Sheets

TRANSPARENT REMOTE DATA STORAGE DEVICE AND METHOD

TECHNICAL FIELD OF THE INVENTION

The present invention relates to data storage available for use by an electronic device.

BACKGROUND OF THE INVENTION

Many portable electronic devices, such as personal digital assistants (PDAs) and digital cameras, input, process, and store data. The data may then be downloaded or otherwise transferred to a data processing device, such as a personal computer, for further processing. One method of transferring data from the electronic device to a computer is by the use of a removable memory device or memory card that stores data generated by the electronic device. The removable memory device may be removed from the electronic device and connected to a computer, which effectively transfers the data to the computer.

As described above, electronic devices process and store data. The processing and storage of data requires memory, such as a random access memory and often a cache memory, or simply a cache, to operate efficiently. The random access memory may, as an example, be flash memory that is used to store data. In the embodiment of the electronic device being a digital camera, the flash memory may store image data representative of images captured by the digital camera. In the embodiment of the electronic device being a PDA, the random access memory may store data, such as database information that is to be revised or updated by the PDA. The cache is used as temporary data storage during the execution of a program. The data stored in the cache is typically data that is repeatedly accessed during the execution of the program. The random access memory is typically located on the removable memory device. Accordingly, the memory capabilities of the electronic device are limited by the memory capabilities of the removable memory device.

As the processing capabilities of electronic devices increase, their available memory sizes must be increased in order to maintain the optimal performance of the electronic devices. For example, the software that operates an electronic device may be improved, which may require more memory in order to operate optimally. Likewise, the cache size may also need to be increased accordingly. Increasing the available memory may be accomplished by replacing the removable memory device with one having a greater amount of memory. However, the cost of the removable memory devices tends to be relatively expensive. Thus, increasing the available memory of the electronic device may be prohibitively costly.

Therefore, a need exists to overcome all or some of the above-described problems.

SUMMARY OF THE INVENTION

A memory device for use by an electronic appliance is disclosed herein. One embodiment of the memory device may comprise a first data port, a second data port, a data storage portion, and a data allocation device. The first data port may be operatively connectable to the electronic appliance. The second data port may be operatively connectable to a remote memory device. The data allocation device may be operatively connected to the first data port, the second data port, and the data storage portion. The data allocation device may be adapted to allocate a portion of memory within the remote memory device for use by the electronic appliance and route data between the first data port, the second data port, and the data storage portion.

DETAILED DESCRIPTION OF THE INVENTION

Figure 1:
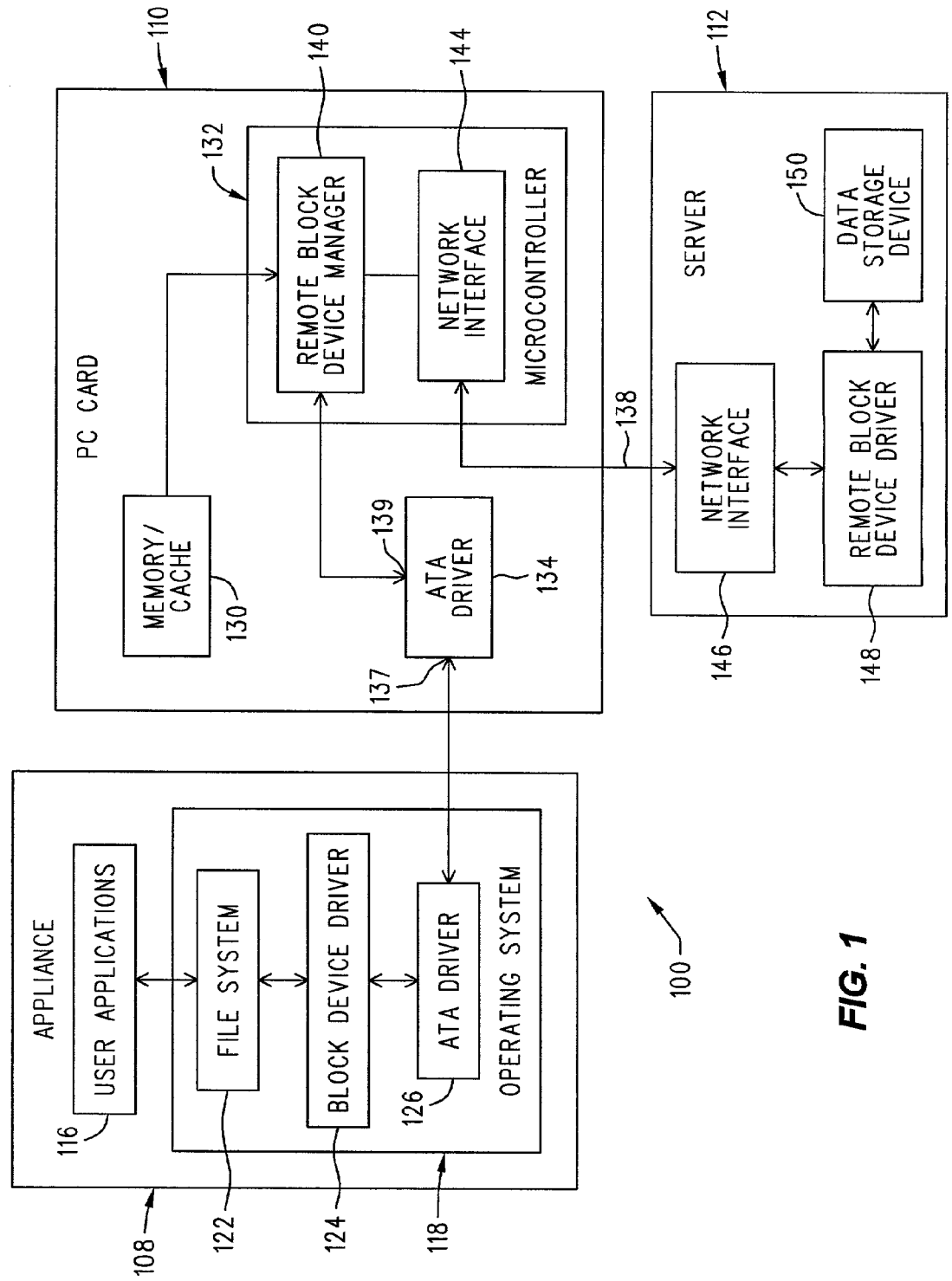
FIG. 1 is a block diagram of an electronic appliance having a data storage device connected thereto that in turn is operatively connected to an electronic network.

A non-limiting embodiment of an electronic system 100 comprising an electronic device or appliance 108, a memory card 110, and a server 112 is shown in FIG. 1. In the non-limiting examples described herein, the appliance 108 may, as examples, be a conventional digital camera or personal digital assistant (PDA) and may be electrically or otherwise operatively connected to the memory card 110. The memory card 110 may be similar to a conventional, removable memory or data storage device that functions in conjunction with the electronic system 100. One example of such a device is a PCMCIA card. The memory card 110 is sometimes referred to herein as an integral data storage device, meaning that it functions directly with the appliance 108.

In addition to storing data, the memory card 110 may also serve to electrically or otherwise operatively connect the appliance 108 to the server 112 as described in greater detail below. The server 112 may be a conventional server having data storage or memory associated therewith as is described in greater detail below. The server 112 and the data storage or memory associate therewith may also be referred to as a remote data storage device.

A block diagram of software associated with the appliance 108 is shown in FIG. 1. The software shown in FIG. 1 serves to process data generated by the appliance 108 and to communicate with the memory card 110. The appliance 108 may have user applications 116 that run by way of an operating system 118. In the embodiment of the appliance 108 being a digital camera, the user applications 116 may, as an example, be programs that serve to operate the digital camera. Such programs may enable a user to process image data representative of images captured by the digital camera. In an embodiment of the appliance 108 being a PDA, the user applications 116 may be word processing programs or data bases.

The operating system 118 may be a conventional operating system that is used in small appliances, such as PDAs and digital cameras. The operating system 118 may have a file system 122, a block device driver 124, and an advanced technology attachment (ATA) driver 126 associated therewith. As will be described in greater detail below, the ATA driver 126 serves to interface or otherwise communicate with the memory card 110. The communications provide for the transfer of data between the appliance 108 and the memory card 110. The use of the ATA driver 126 provides for the memory card 110 to appear to be a conventional memory device relative to the appliance 108. Thus, transfers of data between the appliance 108 and the memory card 110 may be accomplished as though the memory card 110 is a conventional memory device, such as random access memory device or a hard drive. Another example of the memory associated with the memory card is flash memory. As described below, these data transfers enable the appliance 108 to communicate with the server 112 as though the appliance 108 is communicating with a conventional memory device. Although an ATA driver has been described herein, it is to be understood that the use of an ATA driver is for illustration purposes only and that other drivers or interfaces may be used herein. For example, a flash file system (FFS) or small computer system interface (SCSI) may be used herein.

The memory card 110 may, except for the differences described herein, function similar to a conventional removable memory device or circuit that additionally communicates with a remote electronic device having data storage associated therewith. In one embodiment of the memory card 110, is adapted to communicate with an electronic computer network. The memory card 110 may have a plug, not shown in FIG. 1, that serves to removably, electrically, and physically connect the memory card 110 to the appliance 108. The memory card 110 may have a random access memory/cache 130 (such as a flash memory), a microcontroller 132, and an ATA driver 134 associated therewith or located therein. As described in greater detail below, a network 138 may electrically or otherwise operatively connect the memory card 110 to the server 112. The memory/cache 130 is sometimes referred to as a data storage portion and the microcontroller 132 is sometimes referred to as a data allocation device.

Having summarily described the components of the memory card 110, they will now be described in greater detail. The memory/cache 130 may serve as conventional, nondestructive flash-type memory. In the embodiment of the appliance 108 being a digital camera, the memory/cache 130 may serve to store image data representative of images captured by the digital camera. The memory card 110 may then be removed from the digital camera and plugged into a viewing device, such as a personal computer, that processes the image data to replicate the captured images. The memory/cache 130 may also serve a caching function in conjunction with the operation of the appliance 108. In many embodiments, it is preferred that the memory/cache 130 serve as a caching device so that large data files or large amounts of data may be stored in the server 112 as is described in greater detail below. This caching enables the appliance 108 to rapidly and efficiently access relatively small quantities of data while larger quantities of data are stored on the server 112. For example, if the appliance 108 is a digital camera, the memory/cache 130 may be used to store or otherwise cache image data that is being processed. More permanent data may be stored on the server 112. As will be described in greater detail below, the configuration of the memory card 110 in conjunction with the server 112 allows for more memory to be available for the appliance 108 to store data. In one embodiment of the electronic system 100, the memory/cache 130 serves as memory when the memory card 110 is not connected to the server 112 and as cache when the PC card 110 is connected to the server 112.

The ATA driver 134 may have a first data port 137 and a second data port 139. The first data port 137 may be operatively connected to the ATA driver 126 in the appliance 108 and the second data port 139 may be operatively connected to the microcontroller 132. Accordingly, the first data port 137 serves as an interface between the memory card 110 and the ATA driver 126 of the appliance 108. Thus, the ATA driver 134 serves as an interface between the memory card 110 and the appliance 108. The ATA driver 134 also serves to make the memory card 110 look like a conventional or generic data storage device having more data storage than that available in the memory/cache 130. As described below, the additional data storage is available by use of the server 112.

The microcontroller 132 may have a remote block device manager 140 and a network interface 144 associated therewith. The remote block device manager 140 may be operatively associated or connected to the ATA driver 134, the memory/cache 130, and the network interface 144. As described in greater detail below, the microcontroller 132 serves to route data between the appliance 108 and either the memory/cache 130 or the server 112 and serves as a data allocation device. The microcontroller 132 may also route data between the server 112 and the memory/cache 130. The routing of the data is transparent to the appliance 108 so that the software within the appliance 108 simply stores data to the memory card 110 without knowing where the data is being routed by the microcontroller 132. The network interface 144 may serve to operatively connect the memory card 110 and, thus, the appliance 108 to the server 112 via the network 138. Accordingly, the network interface 144 serves as a data port between the memory card 110 and the server 112 via the network 138.

The server 112 may be located remote from the appliance 108 and the memory card 110 and may be operatively connected to the memory card 110 via the network 138. Thus, the server 112 and the data storage associated therewith is sometimes referred to as a remote data storage device. The network 138 may comprise virtually any means of connecting the memory card 110 to the server 112. For example, the network 138 may be a physical hard wire, or a wireless system, such as the use of radio frequency devices or infrared devices. Additionally, the network 138 may include a network such as the Internet. The server 112 may have a network interface 146, a remote block device manager 148, and a data storage device 150 associated therewith. The network interface 146 may serve in a similar manner as the network interface 144 in the memory card 110 by connecting the network 138 to the server 112. The remote block device manager 148 may be operatively connected to the network interface 146 and the data storage device 150. The data storage device 150 may be a conventional data storage device, such as magnetic or optical media.

Figure 2:
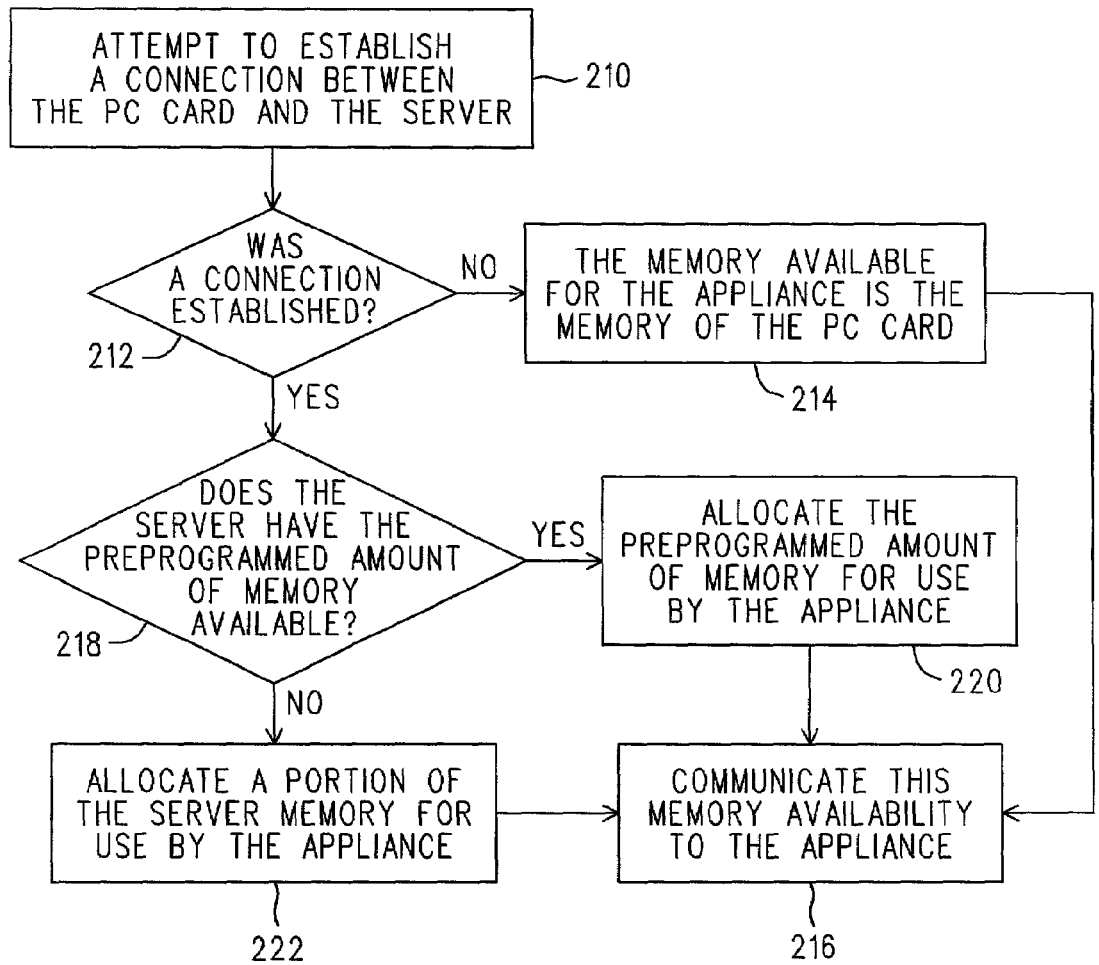
FIG. 2 is a flowchart illustrating the operation of the electronic device establishing data storage utilization with the electronic network.

Having described the components of the electronic system 100, the operation of the electronic system 100 will now be described. The operation of the electronic system 100 is further illustrated by the flowchart of FIG. 2 in conjunction with the block diagram of FIG. 1.

In the following operational description, the appliance 108 is, for illustration purposes, a device that receives, processes, and stores data. One example of the appliance 108 is a digital camera that receives data in the form of an image, processes the image into image data, and stores the image data. Another example of the appliance 108 is a palm computer or a PDA. The electronic system 100 described herein stores data in the memory/cache 130 portion of the memory card 110 in addition to the data storage device 150 of the server 112. Caching for use in the processing of data is, for illustration purposes, generally achieved by the memory/cache 130 and more long term storage is achieved by the use of the data storage device 150. The use of the data storage device 150 is transparent to the appliance 108. Therefore, the appliance 108 functions as though it is communicating solely with the memory card 110 and not with the data storage device 150.

Prior to the operation of the electronic system 100, the memory card 110 is connected into the appliance 108. In one embodiment, the memory card 110 is electrically connected to a connector, not shown, on the appliance 108. The microcontroller 132 within the memory card 110 causes the network interface 144 to attempt to establish a connection with the network 138 as depicted in block 210. If a network connection cannot be established as depicted in block 212, the memory available for use by the appliance 108 is approximately the amount of memory of the memory card 110. If a network connection can be established, the microcontroller 132 attempts to allocate memory for use by the appliance 108 on the server 112. As described in greater detail below, the amount of memory available to the appliance 108 is communicated to the appliance 108 as depicted in block 216.

If the network connection can be established, as depicted in block 212, a second decision, as depicted by the block 218, is made to determine if a preprogrammed or preselected amount of memory is available on the server 112. The preprogrammed amount of memory is an amount of memory that the memory card 110 attempts to allocate for use by the appliance 108. If the preprogrammed amount of memory is available, the microcontroller 132 causes the server 112 to allocate this amount of memory within the data storage device 150 for use by the appliance 108 as depicted in block 220. If the decision of block 218 determines that the preprogrammed amount of memory is not available on the server 112, a portion of memory on the server 112 is allocated for use by the appliance 108. The amount of memory that is eventually allocated for use by the appliance 108 is communicated to the appliance 108 as though the memory is available on the memory card 110. It should be noted that in some situations no memory may be able to be allocated from the server 112 for use by the appliance 108. In this situation, the amount of memory available for use by the appliance 108 is the amount of memory available in the memory/cache 130.

As described above, the memory card 110 is programmed to communicate with the appliance 108. The communications include information relating to the memory available by way of the memory card 110 for use by the appliance 108. Subsequent to the above-described process of determining the amount of memory available for use by the appliance 108, the memory card 110 communicates the amount of memory that is available for use by the appliance 108 to the operating system 118 of the appliance 108. The user applications 116 and the operating system 118 within the appliance 108 may then operate in a conventional manner based on this amount of available memory.

As was described above, if a network connection was not able to be established, the amount of memory available for use by the appliance 108 is the amount of memory of the memory/cache 130. It should be noted that in some embodiments, the amount of memory available to the appliance 108 may be slightly less than the memory of the memory/cache 130 because the microcontroller 132 may use some of the available memory. If the network connection was able to be established, the amount of memory available for use by the appliance 108 is approximately the amount of memory of the memory/cache 130 in addition to the amount of memory allocated on the data storage device 150. The memory allocated on the data storage device 150 is sometimes referred to as virtual memory or virtual storage because it is typically not located local to the appliance 108.

When the amount of memory available for use by the appliance 108 has been communicated to the appliance 108, the operating system 118 within the appliance 108 executes programs based on this amount of available memory. It should be noted that the operating system 118 may only need to read and write data to the memory card 110 to access the available memory. There may be no need for the operating system 118 or any of its associated programs to change their operation because the data may be stored on the server 112 and not directly to the memory card 110. As described above, the memory card 110 looks like a conventional data storage device to the operating system 118 and routes data as necessary to either the server 112 or the memory/cache 130 without any intervention from the appliance 108.

When the amount of available memory has been communicated to the operating system 118, the appliance 108 may execute the user applications 116. The user applications 116 execute by way of the operating system 118 in a conventional manner. The user applications 116 may be resident on a memory device, such as a magnetic media device, within the appliance 108. The user applications 116 may also be resident on a physical circuit, such as a programable integrated circuit, within the appliance. In another embodiment of the electronic system 100, the user applications may be resident on the memory card 110 or the server 112. During the execution of the user applications 116, determinations are made whether data is cache data or conventional data. Cache data means data that is repeatedly used or data that is required for immediate or quick processing within the appliance 108. Conventional data is data that is not cache data. The determination may, as examples, be made by the operating system 118 or by the user applications 116.

All the data that is to be stored by the user applications 116 or the operating system 118 is processed by the ATA driver 126 in order to be output to the memory card 110. The use of the ATA driver 126 makes the memory card 110 and the server 112 transparent to the operating system 118. Accordingly, the operating system 118 functions as though it is reading and writing data to a conventional memory device, such as a flash memory device or a hard disc drive. Thus, no changes to the operating system 118 or the user applications have to be made in order to facilitate the additional memory available to the appliance 108 by way of the connection to the server 112.

A data allocation device, which may include a data base, within the microcontroller 132 may keep track of where the data is being stored. The data allocation device may keep track of locations on both the memory/cache 130 and the data storage device 150 where data is being stored. Accordingly, when a request for data is received by the microcontroller 132 from the operating system 118, the data allocation device is able to make the data available for the operating system 118.

Having described the operation of the electronic system 100, an example of using the electronic system 100 will now be described. In the embodiment described herein, the appliance 108 is a digital camera and the memory card 110 serves as a data storage device in addition to a network interface. The server 112 may simply be a desktop or laptop computer and the network 138 may be an infrared or radio frequency link between the memory card 110 and the server 112.

In the embodiment of the following example, the appliance 108 converts images of objects to image data. The process of converting an image of an object to image data is sometimes referred to as capturing the image. The image data can be stored and processed by the appliance 108. For example, the appliance 108 can process the image data in order to improve the quality of an image that is to be replicated from the image data. The image data may also be stored as described above by writing the image data to the server 112.

The network 138 may be a remote connection, such as a radio frequency connection. Accordingly, the appliance 108 may be operated a distance away from the server 112. The operation of the appliance 108 commences with the memory card 110 attempting to establish a connection with the server 112. If a connection is established with the server 112, the memory card 110 attempts to allocate a portion of the memory of the data storage device 150 for use by the appliance 108. It should be noted that the memory card 110 may attempt to allocate a predetermined amount of memory for use by the appliance 108. Should this predetermined amount of memory not be available on the data storage device 150, the memory card 110 may attempt to allocate less memory space on the data storage device 150.

Subsequent to the attempt to allocate a portion of memory on the server 112, the memory card 110 communicates the amount of memory available for use by the appliance 108 to the appliance 108. As described above, if the network connection can be established, the amount of memory available for use by the appliance 108 is approximately equal to the amount of memory allocated on the data storage device 150 plus the memory of the memory/cache 130. As also described above, some of the memory may be used by the microcontroller 132. If a network connection was not able to be established, the amount of memory available for use by the appliance 108 is approximately equal to the memory of the memory/cache 130.

When the amount of memory available for use by the appliance 108 has been communicated to the operating system 118, the appliance 108 will operate based on this amount of available memory. For example, the number of images that may be captured by the appliance 108 may be significantly increased by the additional use of the memory on the data storage device 150. In one embodiment of the electronic system 100, the server 112 may be a computer, such as a laptop computer. As the images are captured by the appliance 108, they are stored to the server 112, which in turn stores them to the data storage device 150. This eliminates the step of downloading the image data to the computer at a later time. Should the user of the appliance 108 want to process the image data of a captured image, the microcontroller 132 can retrieve the image data processing by the appliance 108. In one embodiment, the image data that is to be processed by the appliance 108 is loaded into the memory/cache 130 in order to speed the processing.

The operation of the appliance 108 will change if the connection to the server 112 changes. For example, if the network 138 is based on a wireless connection, the connection between the memory card 110 and the server 112 is dependent on many variables including the distance therebetween. Should the connection become disrupted, the operation of the appliance 108 will change significantly. In order to overcome this problem, the memory card 110 may have an indication, such as a light located thereon that illuminates in the event a fault in the network 138 occurs. This light informs the user of the problem with the network 138. The user may then reduce the distance between the memory card 110 and the server 112 or perform other measures to resolve the problem. The memory card 110 may continue to attempt to establish a connection to the server 112. Accordingly, should the connection fail or if the connection was never established, the memory card 110 may continually attempt to establish the connection.

In one embodiment of the electronic system 100, the network 138 is a connection to the Internet and the server 112 is a server or other computer located on the Internet. For example, the server 112 may be a personal computer belonging to a user of the appliance 108. In this embodiment, the user may use the server 112 to program the memory card 110 to store data to the server 112 or any other memory device located on the Internet. For example, the user may program the memory card 110 to download image data to a specific web site. Then, as images are captured by the appliance 108, the image data is downloaded directly to the specified web site. Thus, the number of images that may be captured by the appliance 108 is expanded to the amount of data that can be stored relative to the web site.

It should be noted that the transfer of data from the memory card 110 may be suspended during a period that the network 138 is not operative. For example, if the network 138 consists of a telephone line, the network 138 will not function in areas where telephone service is not available. The image data cumulated during these periods may be stored in the memory/cache 130 and downloaded when the connection with the network 138 is reestablished.

It should also be noted that the microcontroller 132 may allocate data by the use of a computer program. Accordingly, the microcontroller 132 may comprise a computer-readable medium, such as memory devices that store programs. The computer-readable medium may store the program that performs the functions described above.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A memory device for use by an electronic appliance, said memory device comprising:
    a first data port operatively connectable to said electronic appliance;
    a second data port operatively connectable to a remote memory device;
    a data storage portion; and
    a data allocation device operatively connected to said first data port, said second data port, and said data storage portion;
    said data allocation device being adapted to:
        allocate a portion of memory within said remote memory device for use by said electronic appliance; and
        route data between said first data port, said second data port, and said data storage portion.

2. The device of claim 1, wherein said second data port is operatively connectable to an electronic network that is operatively connected to said remote memory device.

3. The device of claim 1, wherein said data allocation device comprises a computer and a computer-readable medium operatively associated with said computer, said computer-readable medium comprising instructions for controlling said computer and said data allocation device by:
    establishing a connection with said remote memory device;
    allocating a portion of memory of said remote memory device for use by said electronic appliance; and
    communicating the memory available for use by said electronic appliance to said appliance.

4. The device of claim 3, wherein said instructions further control said computer by determining whether a connection with said remote memory device can be established, and wherein said establishing a connection comprises establishing a connection with said remote memory device if said connection can be established, and wherein said allocating a portion of memory comprises allocating a portion of memory of said external storage device for use by said electronic appliance if said connection with said remote memory device can be established.

5. The device of claim 3, wherein said instructions further control said computer by:
receiving data from said first data port;
determining whether said data received from said first data port is to be stored in said data storage portion or in said remote memory device; and
routing said data to either said data storage portion or said remote memory device based on said determining.

6. The device of claim 5, wherein said routing further control said computer by routing said data to said data storage portion if said data is cache data.

7. The device of claim 3, wherein said instructions further control said computer by:
receiving a request for data from said electronic appliance;
determining the location of said data; and
routing said data to said electronic appliance.

8. The device of claim 3, wherein said instructions further control said computer by continually attempting to establish a connection with said remote memory device.

9. The device of claim 1, wherein said electronic appliance is a camera.

10. The device of claim 1, wherein said electronic appliance is a personal digital assistant.

11. An electronic device comprising:
a processor; and
a memory device operatively connectable to said processor;
said memory device comprising:
a port operatively connectable to a remote memory device;
a data storage portion; and
a data allocation device operatively connected to said port and said data storage portion;
said data allocation device being adapted to:
allocate a portion of said remote memory device for use by said processor; and
route data between said processor, said data storage portion, and said remote memory device, wherein cache data is routed to said data storage portion.

12. The electronic device of claim 11, wherein said port is operatively connectable to an electronic network that is operatively connected to said remote memory device.

13. The electronic device of claim 11, wherein said data allocation device comprises a computer and a computer-readable medium operatively associated with said computer, said computer-readable medium comprising instructions for controlling said computer and said data allocation device by:
establishing a connection with said remote memory device;
allocating a portion of memory of said remote memory device for use by said processor; and
communicating the memory available for use by said processor from said data allocation device to said processor.

14. The electronic appliance of claim 13, wherein said instructions further control said computer by determining whether a connection with said remote memory device can be established, and wherein said establishing a connection comprises establishing a connection with said remote memory device if said connection can be established, and wherein said allocating a portion of memory comprises allocating a portion of memory of said remote memory device for use by said processor if said connection with said remote memory device can be established.

15. The electronic device of claim 14, wherein said instructions further control said computer by continually attempting to establish a connection with said remote memory device.

16. The electronic device of claim 13, wherein said instructions further control said computer by:
receiving data from said processor;
determining whether said data is to be stored in said data storage portion or in said remote memory device; and
routing said data to either said data storage portion or said remote memory device based on said determining.

17. The electronic device of claim 16, wherein said routing further comprises routing said data to said data storage portion if said data is cache data.

18. The electronic device of claim 13, wherein said instructions further control said computer by:
receiving a request for data from said processor;
determining the location of said data; and
routing said data from said location to said processor.

19. The electronic device of claim 11, wherein said memory device is removably, operatively connectable to said processor.

20. A method for operating an electronic appliance, said method comprising:
establishing a data connection between said electronic appliance and a memory device, said memory device comprising a data storage portion and a data allocation device;
establishing a data connection between said memory device and a remote data storage device;
allocating a portion of memory of said remote data storage device for use by said electronic appliance;
transmitting data from said electronic appliance to said memory device; and
allocating said data to be stored in either said data storage portion or said remote data storage device using said data allocation device.

21. The method of claim 20, and further comprising communicating the amount of memory available from said memory device to said electronic device.

22. The method of claim 20 and further comprising continually attempting to establish a data connection between said memory device and said remote memory device.

23. The method of claim 20, wherein said electronic appliance is a camera.

24. The method of claim 20, wherein said electronic appliance is a personal digital assistant.

* * * * *